US011760899B2

(12) United States Patent
Louis et al.

(10) Patent No.: US 11,760,899 B2
(45) Date of Patent: Sep. 19, 2023

(54) POLYMER-METAL JUNCTION COMPRISING PEEK-PEOEK COPOLYMER COMPOSITIONS, IN CONTACT WITH A METAL SUBSTRATE

(71) Applicant: SOLVAY SPECIALTY POLYMERS USA, LLC, Alpharetta, GA (US)

(72) Inventors: Chantal Louis, Alpharetta, GA (US); Mohammad Jamal El-Hibri, Atlanta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 88 days.

(21) Appl. No.: 17/618,902

(22) PCT Filed: Jun. 2, 2020

(86) PCT No.: PCT/EP2020/065185
§ 371 (c)(1),
(2) Date: Dec. 14, 2021

(87) PCT Pub. No.: WO2020/254101
PCT Pub. Date: Dec. 24, 2020

(65) Prior Publication Data
US 2022/0315791 A1 Oct. 6, 2022

Related U.S. Application Data

(60) Provisional application No. 62/864,046, filed on Jun. 20, 2019.

(30) Foreign Application Priority Data

Aug. 20, 2019 (EP) .................................... 19192601

(51) Int. Cl.
| | | |
|---|---|---|
| C09D 161/16 | (2006.01) | |
| C08G 65/40 | (2006.01) | |
| C09D 171/00 | (2006.01) | |
| B32B 27/28 | (2006.01) | |

(52) U.S. Cl.
CPC .......... *C09D 161/16* (2013.01); *B32B 27/288* (2013.01); *C08G 65/40* (2013.01); *C09D 171/00* (2013.01)

(58) Field of Classification Search
None
See application file for complete search history.

(56) References Cited

U.S. PATENT DOCUMENTS

| | | | | |
|---|---|---|---|---|
| 3,516,966 A | * | 6/1970 | Berr | ...................... C08G 61/127 |
| | | | | 528/181 |
| 5,247,051 A | * | 9/1993 | Lucke | ..................... C09J 171/00 |
| | | | | 528/125 |
| 5,250,738 A | | 10/1993 | Hackenbruch et al. | |
| 5,300,693 A | | 4/1994 | Gilb et al. | |
| 9,133,111 B2 | | 9/2015 | Louis et al. | |
| 2013/0183488 A1 | * | 7/2013 | Liao | ........................ B32B 27/22 |
| | | | | 428/141 |

FOREIGN PATENT DOCUMENTS

| | | |
|---|---|---|
| EP | 1559542 A1 | 8/2005 |
| EP | 1459882 B1 | 2/2010 |
| JP | 01221426 A | 9/1989 |
| WO | 2011123790 A1 | 10/2011 |
| WO | 2019053164 A1 | 3/2019 |

OTHER PUBLICATIONS

Ben-Haida A. et al., "Synthesis of a Catechol-Based Poly(Ether Ether Ketone)("o-PEEK") by Classical Step-Growth Polymerization and by Entropically Driven Ring-Opening Polymerization of Macrocyclic Oligomers", Aug. 16, 2006, vol. 39, No. 19, pp. 6467-6472—American Chemical Society.
Murphy J., in "Additives for Plastics Handbook", 2nd Edition, 2001, Chapter 5.2.3., p. 43-48—Elsevier Advanced Technology.
Cheng S.Z.D. et al., "Polymorphism and crystal structure identification in poly(aryl ether ketone ketone)s", Macromolecular Chemistry and Physics, 1996, vol. 197, pp. 185-213—Hüthig & Wepf Verlag, Zug.
Standard ASTM D3418-03, "Standard Test Method for Transition Temperatures and Enthalpies of Fusion and Crystallization of Polymers by Differential Scanning Calorimetry", 2003, p. 1-7.
Standard ASTM E794-06, "Standard Test Method for Melting and Crystallization Temperatures by Thermal Analysis", 2006, p. 1-4.
Standard ASTM E793-06, "Standard Test Method for Enthalpies of Fusion and Crystallization by Differential Scanning Calorimetry", 2006, p. 1-4.
Standard ASTM D1002-10, "Standard Test Method for Apparent Shear Strength of Single-Lap-Joint Adhesively Bonded Metal Specimens by Tension Loading (Metal-to-Metal)", 2010, p. 1-6.

* cited by examiner

*Primary Examiner* — Christopher M Rodd
(74) *Attorney, Agent, or Firm* — Osha Bergman Watanabe & Burton LLP

(57) ABSTRACT

The present invention generally relates a polymer-metal junction comprising PEEK-PEoEK copolymers compositions, in contact with at least a part of the surface of a metal substrate, wherein the PEEK-PEoEK copolymer having RPEEK and RPEoEK repeat units in a molar ratio $R_{PEEK}/R_{PEoEK}$ ranging from 95/5 to 5/95. The present invention also relates to shaped articles including the polymer-metal junction, and methods of making the polymer-metal junctions.

15 Claims, No Drawings

POLYMER-METAL JUNCTION COMPRISING PEEK-PEOEK COPOLYMER COMPOSITIONS, IN CONTACT WITH A METAL SUBSTRATE

RELATED APPLICATIONS

This application is a U.S. national stage entry under 35 U.S.C. § 371 of international patent application No. PCT/EP2020/065185 filed on Jun. 2, 2020, which claims priority to U.S. provisional patent application No. 62/864,046, filed on Jun. 20, 2019, and to European patent application No. 19192601.3, filed on Aug. 20, 2019, the whole content of each being explicitly incorporated herein by reference.

FIELD OF THE INVENTION

The present invention generally relates to a polymer-metal junction comprising PEEK-PEoEK copolymers compositions, in contact with a metal substrate, as well as to shaped articles including the polymer-metal junction, for example a coating on a wire or cable or a part of a mobile electronic device, and to methods to prepare the polymer-metal junction and the shaped articles. The copolymer described herein is generally such that it has $R_{PEEK}$ and $R_{PEoEK}$ repeat units in a molar ratio $R_{PEEK}/R_{PEoEK}$ ranging from 95/5 to 5/95.

BACKGROUND

Poly(aryl ether ketone) polymers (PAEK), such as poly(ether ether ketone) polymers (PEEK), are known for their high temperature performance and excellent chemical resistance; however, their adhesion to metal may be poor or insufficient for profitable use in certain domains, so that their application in areas such as wire coatings, mobile electronics, automotive may be significantly limited. In particular, the development of hybrid and fully electrical vehicles has created ever-growing expectations for materials suitable for making insulated magnet wires, i.e. for sheathing copper or aluminium wires intended to be tight coiled, and exposed to demanding heat and mechanical conditions, while required to possess outstanding dielectric performances. Additional requirements for highly performing materials come from the continuously innovating waive of mobile electronics' applications, internet of things, and digital-enabled technologies; more and more stringent dielectric requirements for insulation of metal conductor and support/shielding of metal parts, and the re-affirmed requirement of continuously meeting challenging light-weighting and mechanical performances, materials which may have been found appropriate in the past may be approaching their limits, and a quest is open for delivering novel and more advanced solutions to these challenges.

PEEK-PEDEK copolymers including PEDEK units of formula: -Ph-Ph-O-Ph-C(O)-Ph-, with -Ph- being a 1,4-phenylene unit, and comprising more than 65% PEEK units of formula -Ph'-O-Ph'-C(O)-Ph'-O—, with -Ph'- being a 1,4-phenylene group, have been known to exhibit improved adhesion to metals but their mechanical properties are not as good as PEEK. For instance, WO 2019/053164 to Solvay Specialty Polymers USA, LLC describes the adhesion to metals of a polymer composition comprising a polymer component including a PEEK/PEDEK copolymer and possibly comprising glass fibres, intended for use in mobile electronic devices, especially in structural components for mobile electronic devices (e.g., framework or housing), wire coatings (e.g. magnet wire coatings in hybrid and electric vehicles), connectors (e.g. electrical connectors), and oil and gas applications (e.g. downhole cable coatings).

On the other side, poly(aryl ether ketone) polymers comprising PEEK units and PEoEK units of formula —O-orthoPh-O-Ph-C(O)-Ph- (with -orthoPh- being a 1,2-phenylene unit; and -Ph- being a 1,4-phenylene unit) have been already described in the art.

For instance, JP1221426 describes notably copolymers of PEEK and PEoEK in its examples 5 and 6, manufactured from hydroquinone, catechol and difluorobenzophenone, as allegedly possessing increased glass transition temperature, and simultaneously excellent heat resistance.

Similarly, A. Ben-Haida et al. in *Macromolecules*, 2006, 39, 6467-6472 describe 50/50 and 70/30 copolymers of PEEK and PEoEK manufactured by step-growth polycondensation of hydroquinone and catechol with 4,4'-difluorobenzophenone in diphenyl sulfone.

DETAILED DESCRIPTION

It has been now found that PEEK-PEoEK copolymers with a PEEK/PEoEK units ratio in the range from 95/5 to 5/95, preferably from 95/5 to 65/35 exhibit good adhesion to metal while retaining good mechanical properties. The low melting temperature of these copolymers further allows processing at lower temperature than PEEK, which prominent feature is an important attribute for processing the said PEEK-PEoEK copolymers into metals sheathings, as notably required for wire-coating, and/or in complex geometry over-molding methods, as practiced in mobile electronics fabrication.

Specifically, the present invention relates to a polymer-metal junction comprising a PEEK-PEoEK copolymer composition, wherein the copolymer has $R_{PEEK}$ and $R_{PEoEK}$ repeat units in a molar ratio $R_{PEEK}/R_{PEoEK}$ ranging from 95/5 to 5/95, preferably from 95/5 to 65/35, the polymer composition including optionally at least one reinforcing filler, at least one additive, or a combination thereof. The present invention relates to shaped articles including the polymer-metal junction of the present invention. Also described are methods of making the PEEK-PEoEK copolymer, methods of making the polymer-metal junction comprising polymer composition.

PEEK-PEoEK Copolymer

As used herein, a "PEEK-PEoEK copolymer" comprises at least 50 mol. %, collectively, of repeat units ($R_{PEEK}$) and repeat units ($R_{PEoEK}$), relative to the total number of moles of repeat units in the PEEK-PEoEK copolymer. In some embodiments, the PEEK-PEoEK copolymer comprises at least 60 mol. %, at least 70 mol. %, at least 80 mol. %, at least 90 mol. %, at least 95 mol. %, and most preferably at least 99 mol. % of repeat units ($R_{PEEK}$) and ($R_{PEoEK}$), relative to the total number of moles of repeat units in the PEEK-PEoEK copolymer.

Repeat unit ($R_{PEEK}$) is represented by formula:

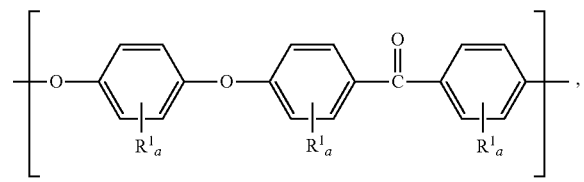

(A)

, and repeat unit ($R_{PEoEK}$) is represented by formula:

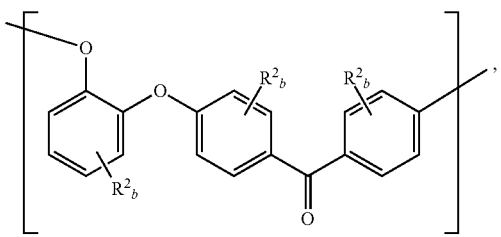
(B)

each $R^1$ and $R^2$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium,
each a and b is independently selected from the group consisting of integers ranging from 0 to 4, and
the PEEK-PEoEK copolymer comprises the repeat units $R_{PEEK}$ and $R_{PEoEK}$ in a molar ratio $R_{PEEK}/R_{PEoEK}$ ranging from 95/5 to 5/95.

In some preferred embodiments, each a is zero, such that the repeat units ($R_{PEEK}$) are repeat units of formula (A-1)

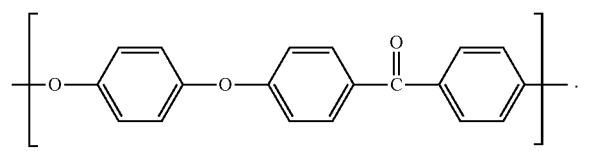
(A-1)

In some preferred embodiments, each b is zero, such that the repeat units ($R_{PEoEK}$) are repeat units of formula (B-1):

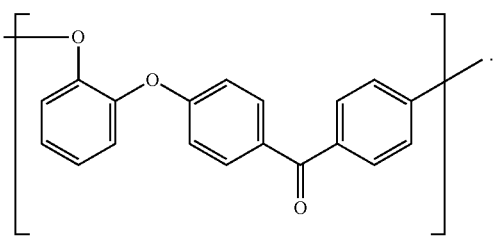
(B-1)

Preferably, repeat units ($R_{PEEK}$) are repeat units of formula (A-1), and repeat units ($R_{PEoEK}$) are repeat units of formula (B-1).

The PEEK-PEoEK copolymer of the present invention may additionally comprise repeat units ($R_{PAEK}$) different from repeat units ($R_{PEEK}$) and ($R_{PEoEK}$), as above detailed. In such case, the amount of repeat units ($R_{PAEK}$) can be comprised between 0.1 and less than 50 mol. %, preferably less than 10 mol. %, more preferably less than 5 mol. %, most preferably less than 2 mol. %, with respect to the total number of moles of repeat units of PEEK-PEoEK copolymer.

When repeat units ($R_{PAEK}$) different from repeat units ($R_{PEEK}$) and ($R_{PEoEK}$) are present in the PEEK-PEoEK copolymer of the present invention, these repeat units ($R_{PAEK}$) different from units ($R_{PEEK}$) and ($R_{PEoEK}$), as described above, generally comply with any of the following formulae (K-A) to (K-M) herein below:

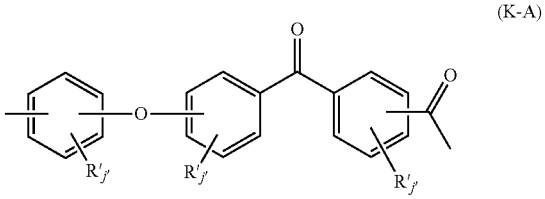
(K-A)

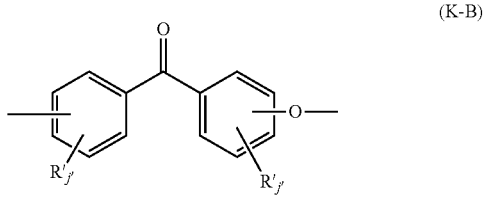
(K-B)

(K-C)

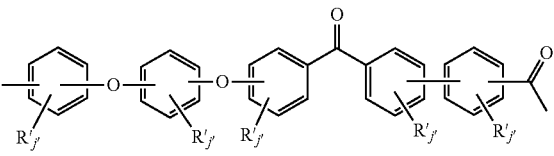
(K-D)

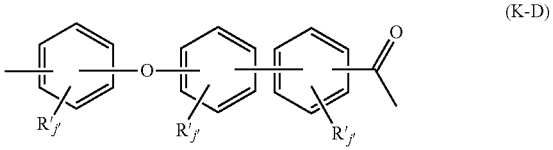
(K-E)

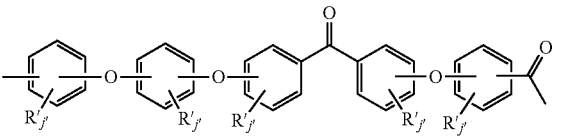
(K-F)

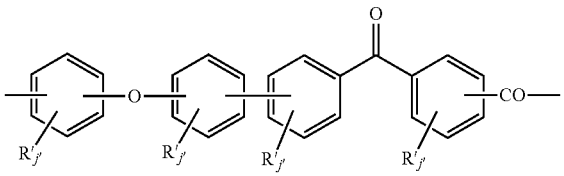
(K-G)

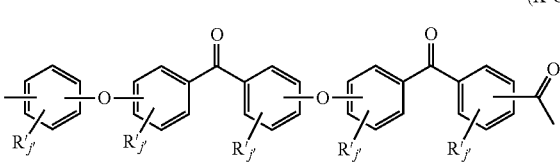

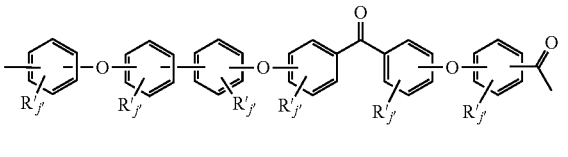

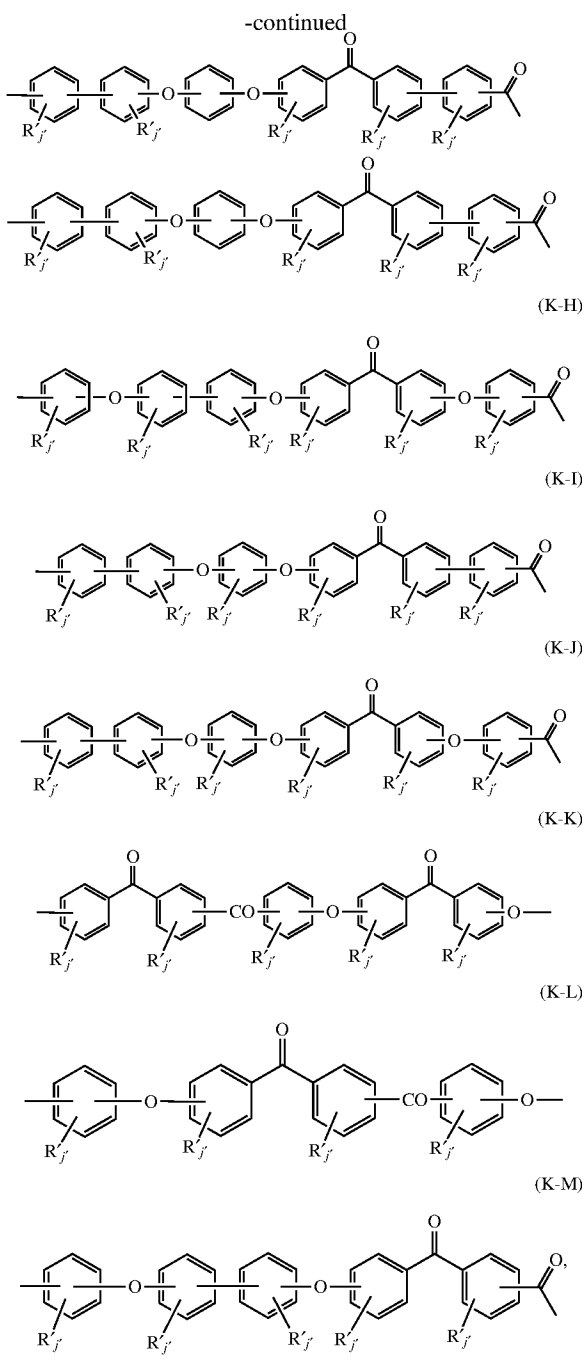

(K-H)
(K-I)
(K-J)
(K-K)
(K-L)
(K-M)

wherein in each of formulae (K-A) to (K-M) above, each of R', equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; and each of j', equal to or different from each other, is independently selected at each occurrence from 0 and an integer of 1 to 4, preferably j' being equal to zero.

It is nevertheless generally preferred for the PEEK-PEoEK copolymer of the present invention to be essentially composed of repeat units ($R_{PEEK}$) and ($R_{PEoEK}$), as above detailed. Thus, in some preferred embodiments, the PEEK-PEoEK copolymer consists essentially of repeat units $R_{PEEK}$ and $R_{PEoEK}$. As used herein, the expression "consists essentially of repeat units $R_{PEEK}$ and $R_{PEoEK}$" means that any additional repeat unit different from repeat units $R_{PEEK}$ and $R_{PEoEK}$, as above detailed, may be present in the PEEK-PEoEK copolymer in amount of at most 2 mol. %, at most 1 mol. % or at most 0.5 mol. %, relative to the total number of moles of repeat units in the PEEK-PEoEK copolymer, and so as not to substantially alter the advantageous properties of the PEEK-PEoEK copolymer.

Repeat units $R_{PEEK}$ and $R_{PEoEK}$ are present in the PEEK-PEoEK copolymer in a $R_{PEEK}/R_{PEoEK}$ molar ratio ranging from 95/5 to 5/95. Yet, it is generally understood that preferred PEEK-PEoEK copolymers suitable for the metal-junction of the invention are those wherein $R_{PEEK}$ units are majority units, that is to say that the $R_{PEEK}/R_{PEoEK}$ molar ratio preferably ranges from 95/5 to more than 50/50, even more preferably from 95/5 to 60/40, still more preferably from 90/10 to 65/35, most preferably 85/15 to 70/30.

It has been generally found that preferred PEEK-PEoEK copolymers are those generally possessing a solubility of below 0.2% wt in N-methylpyrrolidone (NMP), N,N-dimethylacetamide (DMAc) and N,N-dimethylformamide (DMF), when determined at a temperature of 150° C. or less. In other terms, the PEEK-PEoEK copolymer of the polymer-metal junction of the invention is advantageously substantially insoluble in the above-listed solvents. It is noticeable mentioning that this is a further prominent feature differentiating the preferred PEEK-PEoEK copolymers of the invention from those described by A. Ben-Haida et al. in the cited reference and in JP1221426, cited above, which make them particularly adapted for use in polymer-metal junctions requiring improved chemical resistance.

In some embodiments, the PEEK-PEoEK copolymer has a melting temperature (Tm) of less than or equal to 340° C., preferably less than or equal to 335° C. The melting temperatures described herein are measured as the peak temperature of the melting endotherm on the second heat scan in a differential scanning calorimeter (DSC) according to ASTM D3418-03 and E794-06, and using heating and cooling rates of 20° C./min.

In some embodiments, the PEEK-PEoEK copolymer has as heat of fusion (ΔH) of at least 1 J/g, preferably at least 2 J/g, at least 5 J/g. The heats of fusion described herein are determined as the area under the melting endotherm on the second heat scan in a differential scanning calorimeter (DSC) according to ASTM D3418-03 and E793-06, with heating and cooling rates of 20° C./min. In some aspects, the PEEK-PEoEK copolymer may have a heat of fusion (ΔH) of at most 65 J/g, preferably at most 60 J/g.

According to certain preferred embodiments, the PEEK-PEoEK copolymer possesses a microstructure such that its FT-IR spectrum, when recorded between 600 and 1,000 $cm^{-1}$ in ATR mode on polymer powder, is such that the following inequalities are satisfied:

(i)

$$\frac{A_{700 cm^{-1}}}{A_{704 cm^{-1}}} \leq 0.99,$$

wherein $A_{700\ cm^{-1}}$ is the absorbance at 700 $cm^{-1}$ and $A_{704\ cm^{-1}}$ is the absorbance at 704 $cm^{-1}$;

(ii)

$$\frac{A_{816 cm^{-1}}}{A_{835 cm^{-1}}} \geq 0.61,$$

wherein $A_{816\ cm^{-1}}$ is the of absorbance at 816 cm$^{-1}$ and $A_{835\ cm^{-1}}$ is the absorbance at 835 cm$^{-1}$;
(iii)

$$\frac{A_{623\,cm^{-1}}}{A_{557\,cm^{-1}}} \le 1.60,$$

wherein $A_{623\ cm^{-1}}$ is the of absorbance at 623 cm$^{-1}$ and $A_{557\ cm^{-1}}$ is the absorbance at 557 cm$^{-1}$;
(iv)

$$\frac{A_{928\,cm^{-1}}}{A_{924\,cm^{-1}}} \le 1.09,$$

wherein $A_{928\ cm^{-1}}$ is the of absorbance at 928 cm$^{-1}$ and $A_{924\ cm^{-1}}$ is the absorbance at 924 cm$^{-1}$.

Preferred PEEK-PEoEK copolymers possessing the specific microstructure (including monomers' concatenation, end groups and defects), which is characterized by the spectroscopic features above, is particularly preferred for use in the polymer-metal junctions of the present invention, as delivering improved chemical and mechanical performances, coupled with outstanding dielectrical properties, while ensuring outstanding adhesion to metal.

The PEEK-PEoEK copolymer may be such that it has a calcium content of less than 5 ppm, as measured by Inductively Coupled Plasma Optical Emission Spectrometry (ICP-OES) calibrated with standards of known calcium content. Such a particularly low and controlled Ca content is particularly beneficial when the said PEEK-PEoEK copolymer is to be used in metal junctions requiring very stringent dielectric performances. According to these preferred embodiments, the PEEK-PEoEK copolymer may have a calcium content of less than 4 ppm, less than 3 ppm or even more preferably less than 2.5 ppm.

In these preferred embodiments, the PEEK-PEoEK copolymer may also be such that it has a sodium content of less than 1,000 ppm, as measured by Inductively Coupled Plasma Optical Emission Spectrometry (ICP-OES) calibrated with standards of known sodium content. Preferably, the PEEK-PEoEK copolymer may have a sodium content of less than 900 ppm, less than 800 ppm or even more preferably less than 500 ppm.

In some embodiments, the PEEK-PEoEK copolymer may be such that it has a phosphorus content of at least 6 ppm, as measured by Inductively Coupled Plasma Optical Emission Spectrometry (ICP-OES) calibrated with standards of known phosphorus content. Preferably, the PEEK-PEoEK copolymer has a phosphorous content of at least 10 ppm, at least 15 ppm or even more preferably at least 20 ppm.

In the polymer-metal junction of the present invention, it may be advantageous to select PEEK-PEoEK copolymers having increased thermal stability, which may be particularly beneficial in certain fields of use, such as in magnet wires and/or in oil and gas assemblies; accordingly, PEEK-PEoEK copolymers of these preferred polymer-metal junctions have a peak degradation temperatures of at least 550° C., as measured TGA according to ASTM D3850, more preferably at least 551° C. and even more preferably at least 552° C.

Method of Making the PEEK-PEoEK Copolymer

Methods adapted for making PEEK-PEoEK copolymers are generally known in the art. Generally, the PEEK-PEoEK copolymer used in the polymer-metal junction of the invention is made by a method which comprises reacting at least one difluoro-compound of formula (C):

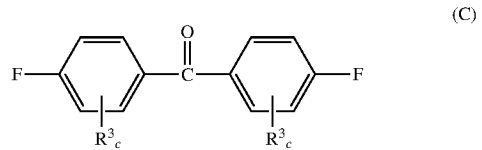

(C)

with a mixture of di-hydroxy compounds of formulas (D) and (E):

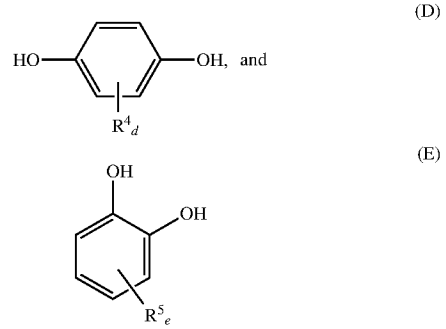

(D)

(E)

in a molar ratio (D)/(E) ranging from 95/5 to 5/95, wherein $R^3$, $R^4$, and $R^5$, have the meaning specified above, each c, d, and e is independently selected from the group consisting of integers ranging from 0 to 4, in a polar organic solvent in the presence of a base, such as, for example, $Na_2CO_3$, $K_2CO_3$, or a combination thereof. Preferably each of c, d, and e is zero.

The method of the invention may comprise terminating the (poly)condensation reaction by reaction with at least one suitable agent; agents which may be used for terminating the polycondensation reaction include compounds which terminate chain growth by being incorporated in the polymer backbone via a condensation reaction (also referred to as end-capping agents) and compounds which terminate chain growth without being incorporated in the polymer backbone through a condensation reaction (also referred to as terminating agents).

End-capping agents used in the method of making the PEEK-PEoEK copolymer notably include those represented by formula (F) below:

(F)

wherein
$R^6$ is F, Cl, or OH,
$R^7$ is —C(O)—Ar—$R^{10}$, —O—Ar—$R^{10}$, —SO$_2$—Ar—$R^{10}$, —Ar—$R^{10}$, an alkyl (e.g. a $C_1$-$C_{10}$ alkyl or a $C_1$-$C_5$ alkyl) or —H, with Ar being an arylene group comprising at least one benzene ring (i.e. one benzene ring or several benzene rings), and with $R^{10}$ being F, Cl or H.

Preferably, $R^7$ is —C(O)—Ar—$R^{10}$, Ar—$R^{10}$ or H, with $R^{10}$ being F, Cl or H. According to certain preferred embodiments, $R^{10}$ is F.

Preferably, $R^6$ is F or OH. More preferably, $R^6$ is F.

When $R^7$ is different from —H, $R^6$ and $R^7$ may be 1,2- or ortho-substitution on the phenylene cycle of formula (F) or they may be 1,3- or meta-substitution on the phenylene cycle. Alternatively, $R^6$ and $R^7$ may preferably be 1,4- or para-substitution on the phenylene cycle of formula (F).

In some embodiments, the end-capping agent is selected from the group consisting of 4,4'-difluorobenzophenone, phenol, 4-phenoxyphenol, 4-phenylphenol, 4-fluorobenzophenone, 3-fluorobenzophenone, 2-fluorobenzophenone, 4,4'-dichlorodiphenylsulfone, 4,4'difluorodiphenylsulfone and a mixture thereof.

Difluoro-compounds and monofunctional phenols are preferably used as end-capping agents. In some embodiments, the end-capping agent is an excess of a difluoro-compound monomer. The end-capping agent used in the method of the present invention is preferably 4,4'-difluorobenzophenone, 4,4'-difluorobenzophenone, phenol, 4-phenoxyphenol, 4-phenylphenol or a mixture thereof.

Lithium chloride is one example of a terminating agent, which will terminate the reaction without being incorporated in the polymer backbone through condensation.

In some embodiments, the reaction is terminating with at least one end-capping agent and with at least one terminating agent other than an end-capping agent. Preferably, 4,4'-difluorobenzophenone and lithium chloride are respectively used as end-capping agent and terminating agent in the method of the present invention.

The (poly)condensation reaction is carried out with a slight excess of difluoro-compound of formula (C); it is further understood that, when used, the end-capping agent may be added to the reaction mixture at the inception of the polycondensation; as a whole, hence, the molar ratio $[(C)+(F)]/[(D)+(E)]$ is $\geq 1.000$, preferably $\geq 1.003$, more preferably $\geq 1.006$, even more preferably $\geq 1.010$.

Preferably, the compound of formula (C) is 4,4'-difluorobenzophenone (DFBP). Preferably, the compound of formula (D) is hydroquinone. Preferably, the compound of formula (E) is catechol (which may be also referred to as pyrocatechol or 1,2-dihydroxybenzene). In some embodiments, the compound of formula (C) is 4,4'-difluorobenzophenone (DFBP), the compound of formula (D) is hydroquinone, and the compound of formula (E) is catechol.

The method of the present invention is conducted in a solvent preferably comprising diphenyl sulfone. In some embodiments, the solvent comprises at least 50 wt. % of diphenylsulfone, based on the total weight of solvent in the reaction mixture, for example at least 60 wt. %, at least 70 wt. %, at least 80 wt. %, at least 90 wt. %, at least 95 wt. % or at least 98 wt. %, based on the total weight of solvent in the reaction mixture. In some embodiments, the solvent consists essentially in diphenylsulfone. In the method of the present invention, a solvent comprising limited amounts of impurities, as detailed in U.S. Pat. No. 9,133,111 is generally used.

The solvent of the present invention may comprise benzophenone and/or dibenzothiophene dioxide.

The method of the present invention is conducted in the presence of a base, for example selected from the group consisting of potassium carbonate ($K_2CO_3$), potassium bicarbonate, sodium carbonate ($Na_2CO_3$), cesium carbonate ($Cs_2CO_3$), potassium phosphate and sodium bicarbonate. The base acts to deprotonate the components (D) and (E) during the condensation reaction. The condensation is preferably carried out in the presence potassium carbonate ($K_2CO_3$), sodium carbonate ($Na_2CO_3$) or a mixture of both, most preferably a mixture of both.

The reaction mixture is polycondensed, within the temperature range, until the requisite degree of condensation is reached. The polycondensation time can be from 0.1 to 10 hours, preferably from 0.2 to 4 or from 0.5 to 3 hours, depending on the nature of the starting monomers and on the selected reaction conditions.

After (poly)condensation, the copolymer is recovered.

The solvent and the inorganic constituents, for example sodium fluoride or potassium fluoride or excess of base, can be removed by suitable methods such as dissolving and filtering, screening or extracting. This is generally achieved through steps (a) to (d) and (e) to (g) or (e') to (g').

Once a solid phase is isolated in step (a), the solid phase may be first exposed to at least one of comminution, pulverizing, and triturating, so as to be provided under the form of small particles. Generally, the solid phase is ground under the form of a powder.

In step (b), the solid phase comprising the PEEK-PEoEK copolymer is contacted with a solvent having a normal boiling point of less than 100° C.; this solvent having a normal boiling point (i.e. a boiling point under normal pressure, i.e. under a pressure of 1 atm) of less than 100° C. can be selected among polar organic solvents, in particular solvents possessing at least one carbonyl group and/or at least one hydroxyl group. Low boiling point ketones and alcohols are exemplary embodiment's thereof; preferred solvents used in step (b) are those selected from the group consisting of acetone, methyl ethyl ketone, ethanol, methanol, isopropanol, which may be used singly or in admixture.

In optional step (c), use is made of demineralized water. Methods for providing demineralized water are well-known and their choice is not critical. To the extent demineralized water is used, it generally possesses an overall Na and Ca concentration of less than 30 ppm, preferably less than 25 ppm, more preferably less than 20 ppm.

In step (d), the solid residue (1), comprising the PEEK-PEoEK copolymer, is contacted with an aqueous solution of a protic acid having a pKa of at most 6, preferably at most 4, most preferably at most 3. The choice of the said protic acid is not particular critical, provided it complies with the mentioned pKa requirements. Hydrochloric acid, oxalic acid, phosphoric acid, acetic acid, formic acid, and mixtures thereof may be used as suitable protic acids in this step. Preferably the protic acid is at least one of hydrochloric acid, oxalic acid or phosphoric acid. It is nonetheless understood that HCl is a preferred acid to be used in this step.

Optional steps (e) or step (f') are carried out by contacting with a solvent having a normal boiling point of less than 100° C.; features described above in connection with solvent used in step (b) are equally applicable for the selection of solvent used in steps (e) or (f'). Further, while different solvents may be used in step (b) and steps (e) or (f'), it may be convenient to make use of same solvent in both steps, i.e. in steps (b) and (e) or (b) and (f').

Steps (f) and (e') require the use of an aqueous buffer solution, having a pH comprised between 6.0 and 7.0; while organic buffering agents may be used, it is generally preferred to make use of a phosphate-based buffering system. In the steps (f) and (e'), the PEEK-PEoEK copolymer, is preferably performed with an aqueous buffer solution of at least one of sodium dihydrogen phosphate ($NaH_2PO_4$) and disodium hydrogen phosphate ($Na_2HPO_4$). Preferably, the PEEK-PEoEK copolymer is contacted with a solution including both $NaH_2PO_4$ and $Na_2HPO_4$. The phosphate salts used of the solutions used hereby can for example be anhydrous, monohydrate, dihydrate or heptahydrate.

The concentration of the $NaH_2PO_4$ in the aqueous buffer solution is not particularly limited, provided that the requested buffering effect is achieved. Further, it is generally preferred for $NaH_2PO_4$ concentration to be sufficient in order for the copolymer to preferably present a phosphorus content of more than 20 ppm. In other terms, the amount of $NaH_2PO_4$ in the buffer solution is preferably chosen to match the preferred minimal 20 ppm amount of phosphorus atoms attached to the copolymer. The concentration of $NaH_2PO_4$ in the solution is preferably at least 0.002 wt. %, more preferably at least 0.004 wt. %, most preferably at least 0.006 wt. %, most preferably at least 0.01 wt. %. The concentration of $NaH_2PO_4$ in the solution is preferably at most 0.30 wt. %, more preferably at most 0.20 wt. %, most preferably at most 0.10 wt. %, most preferably at most 0.05 wt. %. The concentration of $Na_2HPO_4$ in the solution is preferably at least 0.002 wt. %, more preferably at least 0.004 wt. %, most preferably at least 0.006 wt. %, most preferably at least 0.02 wt. %. The concentration of $Na_{2H}PO_4$ in the solution is preferably at most 0.30 wt. %, more preferably at most 0.20 wt. %, most preferably at most 0.10 wt. %, most preferably at most 0.05 wt. %.

In steps (f) and (e'), the PEEK-PEoEK copolymer is advantageously submitted to washing with the said aqueous buffering solution, in particular the dihydrogen phosphate ($NaH_2PO_4$) and disodium hydrogen phosphate ($Na_2HPO_4$) solution. As used herein, "washing" the copolymer with a solution including at least one of sodium dihydrogen phosphate ($NaH_2PO_4$) and disodium hydrogen phosphate ($Na_2HPO_4$) may involve substantially fixing phosphate groups on the copolymer. "Substantially fixing" means that the PEEK-PEoEK polymer preferably retains a phosphorus content of more than 20 ppm, as determined by Inductively Coupled Plasma Optical Emission Spectrometry (ICP-OES), for example more than 30 ppm, more than 40 ppm, more than 50 ppm or more than 60 ppm.

Optionally, between steps (d) and (e) and/or between steps (e) and (f), the residual solid is contacted with demineralized water at a temperature between 15 to 100° C., preferably between 15 to 40° C., and separating a residual solid from said demineralized water.

The recovery part of the method of the present invention may comprise more than one washing cycles. According to this embodiment, steps (b) to (f), with optional washings with demineralized water between steps (d) and (e) and/or between steps (e) and (f), are optionally repeated multiple times. According to this embodiment also, steps (b) to (d), (e') and (f'), are optionally repeated multiple times.

In some embodiments, the copolymer is contacted with the aqueous buffer solution for a time ranging from 5 minutes to 5 hours, preferably from 10 minutes to 3 hours. Methods of washing polymers are well known to those of skill in the art, and include, for example, slurrying the polymer with the solution including the acid or base, as defined below, and then filtering off the solution.

Step (g) or (g') comprise drying the residual solid (3'), (4) or (4'), for obtaining the PEEK-PEoEK copolymer of the present invention. In this step, drying is generally carried out at a temperature of at least 95° C., for example at least 100° C., for at least one hour, for example at least 2 hours, at least 5 hours, at least 10 hours or 12 hours.

The Polymer Composition

The PEEK-PEoEK copolymer can be desirably incorporated into polymer compositions. The polymer composition includes the PEEK-PEoEK copolymer and at least one of a reinforcing filler, as described below, or at least one additive, different from the reinforcing filler as described below, or a combination thereof. The polymer composition comprises at least 10 wt. %, at least 20 wt. %, at least 30 wt. % of the polymer composition, based on the total weight of the polymer composition. In some embodiments, the polymer composition comprises PEEK-PEoEK copolymer represents at least 50 wt. %, preferably at least 60 wt. %, at least 70 wt. %, at least 80 wt. %, at least 90 wt. %, at least 95 wt. %, at least 99 wt. % of the PEEK-PEoEK copolymer, based on the total weight of the polymer composition. In some embodiments, the polymer composition comprises less than 50 wt. %, preferably less than 45 wt. %, more preferably less than 40 wt. % of the PEEK-PEoEK copolymer, based on the total weight of the polymer composition.

Reinforcing Fillers

In some embodiments, the polymer composition includes at least one reinforcing filler. Reinforcing fillers are well known to those of skill in the art. They are preferably selected from fibrous and particulate fillers different from the pigments as described below. More preferably, the reinforcing filler is selected from mineral fillers (such as talc, mica, kaolin, calcium carbonate, calcium silicate, magnesium carbonate, boron nitride), glass fiber, carbon fibers, synthetic polymeric fiber, aramid fiber, aluminum fiber, titanium fiber, magnesium fiber, boron carbide fibers, boron nitride fibers, rock wool fiber, steel fiber, wollastonite, etc. Nano-scale reinforcing fillers can also be used. These fillers include: single and multi-wall carbon nanotubes, carbon nanofibers, graphene, graphene oxide, and nanoclays such as montmorillonite. Still more preferably, it is selected from mica, kaolin, calcium silicate, magnesium carbonate, glass fiber, carbon fibers and wollastonite.

Preferably, the filler is chosen from fibrous fillers. A particular class of fibrous fillers consists of whiskers, i.e. single crystal fibers made from various raw materials, such as $Al_2O_3$, SiC, BC, Fe and Ni.

In one embodiment of the present invention the reinforcing filler is chosen from wollastonite and glass fiber. Among fibrous fillers, glass fibers are preferred; they include chopped strand A-, E-, C-, D-, S-, T- and R-glass fibers, as described in chapter 5.2.3, p. 43-48 of Additives for Plastics Handbook, $2^{nd}$ edition, John Murphy.

Glass fibers optionally comprised in polymer composition may have a circular cross-section or a non-circular cross-section (such as an oval or rectangular cross-section).

When the glass fibers used have a circular cross-section, they preferably have an average glass fiber diameter of 3 to 30 µm and particularly preferred of 5 to 12 µm. Different sorts of glass fibers with a circular cross-section are available on the market depending on the type of the glass they are made of. One may notably cite glass fibers made from E- or S-glass.

In some embodiments, the glass fiber is standard E-glass material with a non-circular cross section. In some aspects, the polymer composition includes S-glass fibers with a round cross-section.

In some embodiments, the polymer composition includes at least one carbon fiber. As used herein, the term "carbon fiber" is intended to include graphitized, partially graphitized, and ungraphitized carbon reinforcing fibers or a mixture thereof. The carbon fibers can be obtained by heat treatment and pyrolysis of different polymer precursors such as, for example, rayon, polyacrylonitrile (PAN), aromatic polyamide or phenolic resin; carbon fibers may also be obtained from pitchy materials. The term "graphite fiber" is intended to denote carbon fibers obtained by high temperature pyrolysis (over 2000° C.) of carbon fibers, wherein the carbon atoms place in a way similar to the graphite structure.

The carbon fibers are preferably chosen from the group consisting of PAN-based carbon fibers, pitch based carbon fibers, graphite fibers, and mixtures thereof.

In some embodiments, the polymer composition comprises less than 60 wt. %, more preferably less than 50 wt. %, even more preferably less than 45 wt. %, most preferably less than 35 wt. % of reinforcing filler, based on the total weight of the polymer composition.

In some embodiments, the polymer composition comprises at least 10 wt. %, preferably at least 20 wt. %, preferably at least 25%, most preferably at least 30 wt. % of reinforcing filler, based on the total weight of the polymer composition.

Additives

In some embodiments, the polymer composition comprises at least one additive different from the reinforcing filler and from the PEEK-PEoEK copolymer, as above detailed, generally selected from the group consisting of (i) colorants such as a dye (ii) pigments such as titanium dioxide, zinc sulfide and zinc oxide (iii) light stabilizers, e.g. UV stabilizers, (iv) heat stabilizers, (v) antioxidants such as organic phosphites and phosphonites, (vi) acid scavengers, (vii) processing aids, (viii) nucleating agents, (ix) internal lubricants and/or external lubricants, (x) flame retardants, (xi) smoke-suppressing agents, (x) anti-static agents, (xi) anti-blocking agents, (xii) conductivity additives such as carbon black and carbon nanofibrils, (xiii) plasticizers, (xiv) flow modifiers (xv), extenders, (xvi) metal deactivators and (xvii) flow aid such as silica.

In some embodiments, the polymer composition includes less than 20 wt. % of additives, preferably less than 10 wt. %, more preferably less than 5 wt. % and even more preferably less than 2 wt. % of additives, most preferably less than 1 wt. %.

In some embodiments, the polymer composition comprises as an additive 40 wt. % or less of at least one poly(aryl ether sulfone) (PAES) selected from the group consisting of a polysulfone (PSU), a polyphenylsulfone (PPSU), and a poly(ether sulfone) (PES), based on total weight of the polymer composition.

In some embodiments, the polymer composition comprises as an additive 40 wt. % or less of at least one poly(aryl ether ketone) (PAEK) polymers, for example a poly(ether ether ketone) (PEEK) polymer.

In alternative embodiments, the PEEK-PEoEK copolymer, as above detailed, is the only polymeric component in the polymer composition. As used herein, the expression "polymeric component" means a compound having repeat units and a molecular weight of at least 2,000 g/mol. In some embodiments, the polymer composition includes less than 3 wt. %, 2 wt. %, 1 wt. %, 0.5 wt. % of a polymeric component other than the PEEK-PEoEK copolymer.

Methods of Making the Polymer Composition

The polymer composition can be prepared by a variety of methods involving intimate admixing of the components of the polymer composition, for example by dry blending, suspension or slurry mixing, solution mixing, melt mixing or a combination of dry blending and melt mixing. As used herein, the "components of the polymer composition" includes the PEEK-PEoEK copolymer, as above detailed, and at least one of the at least one reinforcing filler, the at least one additive, and of a combination thereof.

Typically, the dry blending of the components of the polymer composition is carried out by using high intensity mixers, such as Henschel-type mixers, paddle mixers or ribbon mixers to obtain the polymer composition as a physical mixture.

Alternatively, the intimate admixing of the components of the polymer composition is carried out by tumble blending based on a single axis or multi-axis rotating mechanism to obtain a physical mixture.

Alternatively, the slurry mixing of the components of the polymer composition is carried out by slurring the components of the polymer composition using an agitator in an appropriate liquid, such as, for example, methanol, followed by filtering the liquid away, to obtain a powder mixture of the components of the polymer composition.

The solution mixing of the components of the polymer composition can be carried out by mixing the components with an agitator in at least one solvent such as, for example, diphenyl sulfone, benzophenone, 4-chlorophenol, 2-chlorophenol, or meta-cresol.

In some embodiments, the method of making the polymer composition includes melt compounding the physical mixture. Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

In some embodiments, the physical mixture is compounded in an extruder and then chopped into pellets or granules. The granules or pellets can then be further processed to manufacture additional shaped articles.

Polymer-Metal Junction and Methods of Making

The polymer-metal junction of the present invention comprises the polymer composition comprising a PEEK-PEoEK copolymer, as described above, in contact with at least part of the surface of a metal substrate.

The metal substrate may have any shape; e.g. it may be under the form of a wire, a sheet or film or may have a different three-dimensional shape, e.g. it may have a tubular shape, or whichever other geometry, including irregular shapes.

It is further understood that the polymer composition may be contacted with the overall surface of the metal surface, or may be in contact with only a part of said surface, whereas the advantageous attributes of the PEEK-PEoEK copolymer coating/protection are required.

The metal substrate may be made of any metallic composition including, but not limited to, aluminum, copper, gold, iron, nickel, platinum, silver, steel, and blends or alloys thereof (e.g., brass and bronze). The metal substrate is preferably made of copper, steel, aluminum, or a combination thereof, most preferably aluminum.

In some embodiments, said part of the surface of the metal substrate (e.g. an aluminum substrate) or the said overall surface of the metal surface is a structured metal surface. "Structured metal surface" as used herein means that the said metal surface has undergone any etching process to roughen the metal surface by removing at least part of the metal. Examples of structured metal surfaces include laser etched metal surfaces and chemically etched metal surfaces. While in some embodiments, the metal surface is an unetched metal surface, and yet, the polymer composition comprising a PEEK-PEoEK copolymer is still able to deliver adhesion, it is generally preferred for at least that part of the surface in contact with the polymer composition comprising said PEEK-PEoEK copolymer to be a structured surface.

In some aspects, the overall surface or at least part of the surface of the metal substrate is a nano-structured metal surface. "Nano-structured metal surface" means a metal surface that has been etched to have a nano-pitted surface with surface peaks and valleys having average depth, height and width dimensions in the nano-scale regime ranging from 10 to 1000 nm, preferably from 30 to 800 nm, and more preferably from 50 to 500 nm. In some embodiments, the metal substrate includes an NMT-treated metal surface. An "NMT-treated metal surface" means a nano-structured surface prepared by any etching/priming process described in EP1459882 B1, EP1559542 A1, or WO 2011123790 A1, the disclosures of which are incorporated herein by reference in their entireties.

In some embodiments, the metal substrate is a wire or cable. In alternative embodiments, the metal substrate is a metal part of a mobile electronic device.

In some embodiments, the polymer-metal junction includes a layer of the polymer composition having a thickness ranging from 0.025 mm to 3 mm.

The polymer-metal junction can be made by contacting the polymer composition as described herein with at least a part of the surface of the metal substrate, preferably with a structured metal surface, more preferably with a nano-structured metal surface, most preferably an NMT-treated metal surface. For example, the polymer composition may be deposited on or over-molded onto at least a part of the surface of the metal substrate using any suitable melt-processing and deposition method. In particular, the polymer-metal junction may be made by injection or compression molding, or coating the polymer composition onto at least a part of the metal substrate. The polymer-metal junction can also be formed by a coating process, by applying the composition comprising the PEEK-PEoEK copolymer, as detailed above, generally under the form of a suitable coating formulation (e.g. under the form of a powder or a liquid composition), by any of suitable coating techniques, including electrostatic or solvent-borne coating, such as spray coating, knife coating, slot die coating, roll coating, brushing and/or any other suitable coating technique.

In some aspects, the polymer-metal junction can be formed by an extrusion process for coating a wire or cable with the composition comprising the PEEK-PEoEK copolymer, as detailed above.

In alternative embodiments the polymer-metal junction is made by an additive manufacturing process, by depositing the composition comprising the PEEK-PEoEK copolymer onto at least a part of the surface of a metal substrate.

It has been found that the polymer-metal junction of the invention has a lap shear stress of at least 4.93 MPa (700 psi), preferably of at least 5.17 MPa (750 psi), more preferably of at least 5.52 MPa (800 psi), when the composition comprising the PEEK-PEoEK copolymer is in contact with a structured aluminum surface (crosshatch pattern having a distance of about 100 μm between parallel lines), as measured according to ASTM D1002, as detailed in the examples.

Shaped Articles and Methods of Making

Exemplary embodiments also include shaped articles including a polymer-metal junction comprising the above-described polymer composition and methods of making the shaped articles.

The shaped article can include one or more parts. When the shaped article is a single part, the single part preferably consists of the polymer metal junction including the polymer composition in contact with at least part of the surface of a metal substrate.

Alternatively, the shaped article may consist of more than one part, one or more of which preferably consists of the polymer metal junction including the polymer composition in contact with at least part of the surface of a metal substrate. When more than one part of the shaped article includes the polymer composition, each part may include the same polymer composition or a different polymer composition as described herein, as well as different metal substrates.

The weight of the polymer composition, based on the total weight of shaped article, is preferably greater than 1 wt. %, greater than 5 wt. %, greater than 10 wt. %, preferably greater than 15 wt. %, greater than 20 wt. %, greater than 30 wt. %, greater than 40 wt. %, greater than 50 wt. %, greater than 60 wt. %, greater than 70 wt. %, greater than 80 wt. %, greater than 90 wt. %, greater than 95 wt. % and greater than 99 wt. %.

The polymer-metal junction of the invention may be well suited for the manufacture of articles useful in a wide variety of applications. For example, the properties of the PEEK-PEoEK copolymer described herein makes the polymer-metal junctions comprising the same especially suitable for use in automotive applications such as for use in magnet wires of hybrid and electric vehicles' magnets, for use in oil and gas applications such as downhole cable coatings, for use in structural components for mobile electronic devices (e.g., framework or housing), for use in electrostatic powder coatings on metal substrates for corrosion protection and abrasion resistance, and for use in parts produced by additive manufacturing for a wide range of applications.

The term "mobile electronic device" is intended to denote any electronic device that is designed to be conveniently transported and used in various locations while exchanging/providing access to data, e.g. through wireless connections or mobile network connection. Representative examples of mobile electronic devices include mobile phones, personal digital assistants, laptop computers, tablet computers, radios, cameras and camera accessories, watches, calculators, music players, global positioning system receivers, portable games, hard drives and other electronic storage devices, and the like.

The shaped article may be selected from a large list of articles such as fitting parts; such as seals, in particular sealing rings, preferably backup seal rings, fasteners and the like; snap fit parts; mutually moveable parts; functional elements, operating elements; tracking elements; adjustment elements; carrier elements; frame elements; films; switches; connectors; wires, cables; bearings, housings, compressor components such as compressor valves and compressor plates, shafts, shells, or pistons, whereas at least a part of the surface of a metal element is in contact with the polymer composition as described above.

In particular, the polymer composition comprising the PEEK-PEoEK copolymer is very well suited for use as a sheathing for wires or cables, as a structural part of a mobile electronic devices, or as a part produced by additive manufacturing. Thus, exemplary embodiments also include shaped articles made, at least in part, by the additive manufacturing methods described below using the polymer composition described above. Such shaped articles can be used in a variety of final applications such as implantable medical devices, dental prostheses, and brackets and complex shaped parts in the aerospace and automotive industries.

Methods of Making the Shaped Articles

The shaped articles described herein can be made from the polymer composition by injection molding, extrusion molding, compression molding, additive manufacturing, continuous fiber impregnation, and continuous fiber composite lamination/consolidation or other shaping technologies.

In some embodiments, the method of making the shaped article or part thereof includes a step of compression molding or injection molding, and subsequent solidification of the polymer composition.

In some embodiments, the method for making the shaped article or shaped article or part thereof includes a step of coating. For example, the polymer composition can be applied to a wire as a coating by any suitable coating method, preferably by extrusion coating around a wire to form a coated wire, preferably a coated magnet wire. Crosshead extrusion process can be advantageously used to coat wires and cables with the said composition comprising the PEEK-PEoEK copolymer, as detailed above. The basic procedure of cross-head extrusion generally includes pulling of the wire or cable to be coated at a uniform rate via a crosshead die, where said wire or cable is covered with the said composition comprising the PEEK-PEoEK copolymer in the molten state: the opening of the crosshead die calibrates advantageously the thickness of the so-created layer of composition comprising the PEEK-PEoEK copolymer around the wire or cable.

Exemplary embodiments are also directed to methods of making shaped articles by additive manufacturing, where the shaped article is printed onto at least a part of the metal surface of a metal substrate from the polymer composition comprising the PEEK-PEoEK copolymer. The methods include printing layers of the shaped article from the polymer composition as described below.

Additive manufacturing systems are used to print or otherwise build a shaped object from a digital representation of the shaped object by one or more additive manufacturing techniques. Examples of commercially available additive manufacturing techniques include extrusion-based techniques, selective laser sintering, powder/binder jetting, electron-beam melting, and stereolithography processes. For each of these techniques, the digital representation of the shaped object is initially sliced into multiple horizontal layers. For each layer, a tool path is then generated, which provides instructions for the particular additive manufacturing system to print the given layer.

For example, in an extrusion-based additive manufacturing system, a shaped article may be printed from a digital representation of the shaped article in a layer-by-layer manner by extruding and adjoining strips of the polymer composition. The polymer composition comprising the PEEK-PEoEK copolymer is extruded through an extrusion tip carried by a print head of the system, and is deposited as a sequence of roads on a platen in an x-y plane. The extruded polymer composition comprising the PEEK-PEoEK copolymer fuses to previously deposited material and solidifies as it cools. The position of the print head relative to the substrate is then incremented along a z-axis (perpendicular to the x-y plane), and the process is repeated to form a shaped article resembling the digital representation. An example of an extrusion-based additive manufacturing system is Fused Filament Fabrication (FFF).

As another example, in a powder-based additive manufacturing system, a laser is used to locally sinter powder into a solid part onto at least a part of the metal surface of a metal substrate. A shaped article is created by sequentially depositing a layer of powder followed by a laser pattern to sinter an image onto that layer. An example of a powder-based additive manufacturing system is Selective Laser Sintering (SLS).

As another example, carbon-fiber composite shaped articles can be prepared using a continuous Fiber-Reinforced Thermoplastic (FRTP) printing method. This method is based on fused-deposition modeling (FDM) and prints a combination of fibers and resin onto at least a part of the metal surface of a metal substrate.

The advantageous properties of the polymer composition discussed above make the polymer composition particularly suitable for additive manufacturing applications.

Accordingly, some embodiments include a method of making a shaped article comprising printing layers of the polymer composition to form the shaped article by an extrusion-based additive manufacturing system (for example FFF), a powder-based additive manufacturing system (for example SLS), or a continuous Fiber-Reinforced Thermoplastic (FRTP) printing method.

According to some embodiments, the polymer composition to be deposited onto at least a part of the metal surface of a metal substrate is provided in the form of microparticles or as a powder. For example, the polymer composition may be provided under the form of particles having an average diameter ranging from 1 to 200 μm, preferably from 10 to 100 μm, preferably from 20 to 80 μm as measured by electron microscopy or laser scattering.

Exemplary embodiments will now be described in the following non-limiting examples.

EXAMPLES

Raw Materials

KETASPIRE® KT-880P [MV (410° C., 46 s$^{-1}$) is 0.18 kPa·s, Tm=344° C.], and KETASPIRE® KT-880GF30 [KT-880 with 30% glass fibres] are aromatic polyetheretherketone (PEEK) polymers available from Solvay Specialty Polymers USA, LLC.

Hydroquinone, photo grade, was procured from Eastman, USA. It contained 0.38 wt % moisture, which amount was used to adapt the charge weights. All weights indicated include moisture.

Resorcinol, ACS reagent grade, was procured from Aldrich, USA 4,4'-Biphenol, polymer grade, was procured from SI, USA.

Pyrocatechol, flakes, was procured from Solvay USA. Its purity was 99.85% by GC. It contained 680 ppm moisture, which amount was used to adapt the charge weights. All weights indicated include moisture.

4,4'-Difluorobenzophenone, polymer grade (99.8%+), was procured from Malwa, India Diphenyl sulfone (polymer grade) was procured from Proviron (99.8% pure).

Sodium carbonate, light soda ash, was procured from Solvay S.A., France.

Potassium carbonate with a $d_{90}$<45 μm was procured from Armand products.

Lithium chloride (anhydrous grade) was procured from Acros.

1,4-bis(4'-fluorobenzoyl)benzene (1,4-DFDK) and 1,3 bis (4'-fluorobenzoyl)benzene (1,3-DFDK) were prepared by Friedel-Crafts acylation of fluorobenzene according to Example 1 of U.S. Pat. No. 5,300,693 to Gilb et al. (filed Nov. 25, 1992 and incorporated herein by reference in its entirety). Some of the 1,4-DFDK was purified as described in U.S. Pat. No. 5,300,693 by recrystallization in chlorobenzene, and some of the 1,4-DFDK was purified by recrystallization in DMSO/ethanol. The 1,4-DFDK purified by recrystallization in DMSO/ethanol was used as the 1,4-DFDK in the polymerization reactions to make PEKK described below, while 1,4-DFDK recrystallized in chlorobenzene was used as precursor for 1,4-bis(4'-hydroxybenzoyl)benzene (1,4-BHBB).

1,4-bis(4'-hydroxybenzoyl)benzene (1,4-BHBB) and 1,3-bis(4'-hydroxybenzoyl)benzene (1,3-BHBB) were produced by hydrolysis of the 1,4-DFDK, and 1,3-DFDK, respectively, following the procedure described in Example 1 of U.S. Pat. No. 5,250,738 to Hackenbruch et al. (filed Feb. 24, 1992 and incorporated herein by reference in its entirety). They were purified by recrystallization in DMF/ethanol.

Determination of the Melting Temperature (Tm), Crystallization Temperature (Tc), Glass Transition Temperature (Tg) and Heat of Fusion The melting temperature Tm was determined as the peak temperature of the melting endotherm on the $2^{nd}$ heat scan in differential scanning calorimeter (DSC) according to ASTM D3418-03, E1356-03, E793-06, E794-06. Details of the procedure as used in this invention are as follows: a TA Instruments DSC Q20 was used with nitrogen as carrier gas (99.998% purity, 50 mL/min). Temperature and heat flow calibrations were done using indium. Sample size was 5 to 7 mg. The weight was recorded ±0.01 mg. The heat cycles were:

$1^{st}$ heat cycle: 30.00° C. to 400.00° C. at 20.00° C./min, isothermal at 400.00° C. for 1 min;
$1^{st}$ cool cycle: 400.00° C. to 30.00° C. at 20.00° C./min, isothermal for 1 min;
$2^{nd}$ heat cycle: 30.00° C. to 400.00° C. at 20.00° C./min, isothermal at 400.00° C. for 1 min.

The melting temperature Tm was determined as the peak temperature of the melting endotherm on the 2nd heat scan. The enthalpy of fusion was determined on the 2nd heat scan. The melting of the composition was taken as the area over a linear baseline drawn from 220° C. to a temperature above the last endotherm.

The crystallization temperature Tc was determined as the peak temperature of the crystallization exotherm on the $1^{st}$ cool scan.

The glass transition temperature Tg (mid-point) was determined on the $2^{nd}$ heat scan according to ASTM D3418-03, E1356-03, E793-06, E794-06.

Determination of the Melt Viscosity and Melt Stability

The melt viscosity was measured using a capillary rheometer according to ASTM D3835. Readings were taken after 10-minute and 40-minute dwell time at 410° C. and a shear rate of 46.3 s-1 using a die with the following characteristics: diameter=1.016 mm, length=20.32 mm, cone angle=120°. The melt stability VR40 is measured by the ratio of the viscosity at 40 minutes over the viscosity at 10 minutes.

Determination of Tensile Properties by Compression Molding

A 762 mm×762 mm×3.2 mm plaque was prepared from the polymer by compression molding of 30 g of polymer under the following conditions:
preheat at $T_1$,
maintain $T_1$ for 20 minutes, under 2000 kg-f
maintain $T_1$ for 2 minutes, under 2700 kg-f
cool down to 30° C. over 40 minutes, under 2000 kg-f
$T_1$ values used for the polymers are indicated in the results table.

The plaques were then annealed at 200° C. for 3 hours.
The 762 mm×762 mm×3.2 mm compression molded plaques were machined into Type V ASTM tensile specimens and these specimens of the various polymer compositions were subjected to tensile testing according to ASTM method D638 at 0.05 inch/minute room temperature (i.e. 23° C.) on 3 specimens. The average of the 3 specimens is presented.

Determination of Tensile Properties by Injection Molding

Type V bars were injection molded on DSM Xplore® Micro Compounder using the following conditions:
compounding:
barrel temperature (top, middle, bottom): 360° C.
75-100 rpm screw speed
4-minute residence time
Molding
Mod temperature: 155° C.
Wand temperature: 345° C.
Molding steps conditions:
12 bar/5 s
10 bar/0.5 s
10 bar/5 s The molded tensile bars were then annealed at 200° C. for 3 hours and subjected to tensile testing according to ASTM method D638 at 0.05 inch/minute room temperature (i.e. 23° C.) on 5 specimens. The average of the 5 specimens is presented.

Determination of Dielectric Properties at 2.4 GHz

Using the compression molded plaque prepared as described above, the dielectric constant and dissipation factor were measured at 2.4 GHz. using the guidelines of ASTM D2520, Method B—Resonant Cavity Perturbation Technique. One (1) replicate of each material was prepared for measurement. Each test sample consisted of one piece of material 0.08 in×0.20 in×1.0 in.

SYNTHESIS EXAMPLES

Comparative Example 1: PEKK with 60/40 T/I Ratio

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 112.50 g of diphenyl sulfone, 33.390 g of 1,3-BHBB, 6.372 g of 1,4-BHBB and 41.051 g of 1,4-DFDK. The flask content was evacuated under vacuum and then filled with high purity nitrogen (containing less than 10 ppm O2). The reaction mixture was then placed under a constant nitrogen purge (60 mL/min).

The reaction mixture was heated slowly to 270° C. At 270° C., 13.725 g of $Na_2CO_3$ and 0.086 g of $K_2CO_3$ was added via a powder dispenser to the reaction mixture over 60 minutes. At the end of the addition, the reaction mixture was heated to 320° C. at 1° C./minute. After 2 minutes at 320° C., 1.207 g of 1,4-DFDK were added to the reaction mixture while keeping a nitrogen purge on the reactor. After 5 minutes, 0.529 g of lithium chloride were added to the reaction mixture. 10 minutes later, another 0.503 g of 1,4-DFDK were added to the reactor and the reaction mixture was kept at temperature for 15 minutes. Another charge of 25 g of diphenyl sulfone was added to the reaction mixture, which was kept under agitation for 15 minutes. The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. 0.67 g of $NaH_2PO_4 \cdot 2H_2O$ and 0.62 g of $Na_2HPO_4$ were dissolved in 1200 mL DI water for the last wash. The powder was then removed from the reactor and dried at 120° C. under vacuum for 12 hours yielding 72 g of a yellow powder.

The properties of the final polymer are detailed in table 3.

Comparative Example 2: Preparation of PEEK-PEDEK Copolymer 75/25

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 128.21 g of diphenyl sulfone, 20.297 g of hydroquinone, 11.411 g of 4,4'-biphenol and 54.377 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 26.955 g of $Na_2CO_3$ and 0.169 g of $K_2CO_3$ was added via a powder dispenser to the reaction mixture over 30 minutes. At the end of the addition, the reaction mixture was heated to 320° C. at 1° C./minute. After 13 minutes at 320° C., 3.742 g of 4,4'-difluorobenzophenone were added to the reaction mixture while keeping a nitrogen purge on the reactor. After 5 minutes, 1.039 g of lithium chloride were added to the reaction mixture. 10 minutes later, another 2.138 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 74 g of a white powder.

The repeat unit of the polymer is:

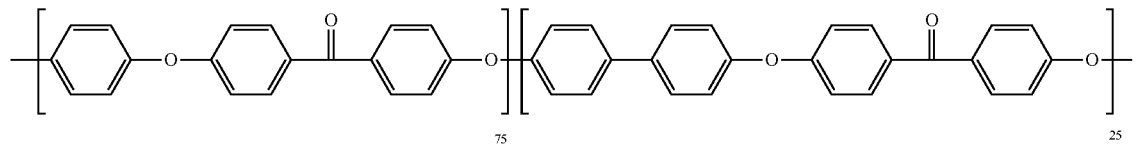

The melt viscosity measured by capillary rheology at 410° C., 46 $s^{-1}$ was 0.28 kN-s/$m^2$.

The properties of the final polymer are detailed in table 3.

Comparative Examples 3 and 4: Preparation of PEEK-PEDEK Copolymer 75/25 and 80/20

The same procedure as comparative example 1 was followed but with the following reagents amounts

TABLE 1

| Examples 3-4 reagents | | |
|---|---|---|
| | CE3 | CE4 |
| PEEK/PEDEK | 75/25 | 80/20 |
| Reagent | Wt (g) | Wt (g) |
| Diphenyl sulfone | 128.21 | 128.21 |
| Hydroquinone | 20.158 | 21.933 |
| 4,4'-biphenol | 11.322 | 9.244 |
| 4,4'-difluorobenzophenone | 53.520 | 55.054 |

TABLE 1-continued

| Examples 3-4 reagents | | |
|---|---|---|
| | CE3 | CE4 |
| $Na_2CO_3$ | 26.744 | 27.294 |
| $K_2CO_3$ | 0.168 | 0.171 |
| Time at 320° C. (minutes) | 16 | 11 |
| 4,4'-difluorobenzophenone in first termination | 3.713 | 3.789 |
| Lithium chloride in second termination | 1.031 | 1.052 |
| 4,4'-difluorobenzophenone in third termination | 2.122 | 2.165 |

The material of comparative example 3a was blended with the material from comparative example 2 (40/60 wt/wt) to prepare material of comparative example 3. The properties of the final polymer are detailed in table 3.

Comparative Example 5: Preparation of PEEK-PEmEK Copolymer 80/20

In a 1000 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 330.00 g of diphenyl sulfone, 52.106 g of hydroquinone, 13.002 g of resorcinol and 132.00 g of 4,4'-difluorobenzophenone. The flask content was evacuated under vacuum and then filled with high purity nitrogen (containing less than 10 ppm O2). The reaction mixture was then placed under a constant nitrogen purge (60 mL/min).

The reaction mixture was heated slowly to 150° C. At 150° C., a mixture of 64.995 g of $Na_2CO_3$ and 0.244 g of $K_2CO_3$ was added via a powder dispenser to the reaction mixture over 30 minutes. At the end of the addition, the reaction mixture was heated to 300° C. at 1° C./minute. After 32 minutes at 300° C., 20.586 g of 4,4'-difluorobenzophenone were added to the reaction mixture while keeping a nitrogen purge on the reactor. After 5 minutes, 2.500 g of lithium chloride were added to the reaction mixture. 10 minutes later, another 5.146 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 100° C. under vacuum for 12 hours yielding 165 g of a light brown powder.

The repeat unit of the polymer is:

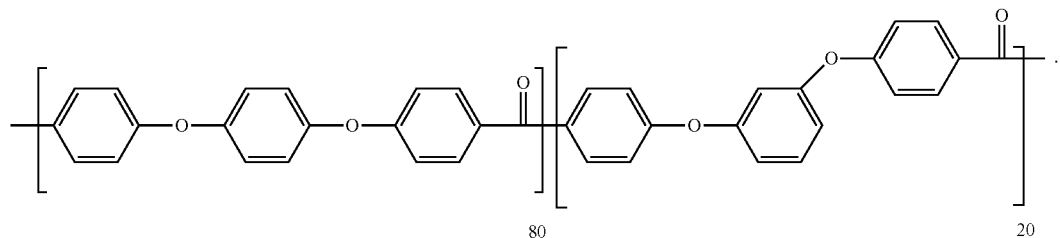

The properties of the final polymer are detailed in table 3.

Example 6: Preparation of PEEK-PEoEK Copolymer 80/20

In a 1000 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 343.63 g of diphenyl sulfone, 61.852 g of hydroquinone, 15.426 g of pyrocatechol and 154.573 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 76.938 g of $Na_2CO_3$ and 0.484 g of $K_2CO_3$ was added via a powder dispenser to the reaction mixture over 30 minutes. At the end of the addition, the reaction mixture was heated to 320° C. at 1° C./minute. After 24 minutes at 320° C., the reaction was terminated in 3 stages: 18.329 g of 4,4'-difluorobenzophenone were added to the reaction mixture while keeping a nitrogen purge on the reactor. After 5 minutes, 2.388 g of lithium chloride were added to the reaction mixture. 10 minutes later, another 6.110 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture by extracting successively with acetone and water at room temperature. The powder was then dried at 120° C. under vacuum for 12 hours yielding 189 g of a white powder.

The repeat unit of the polymer is:

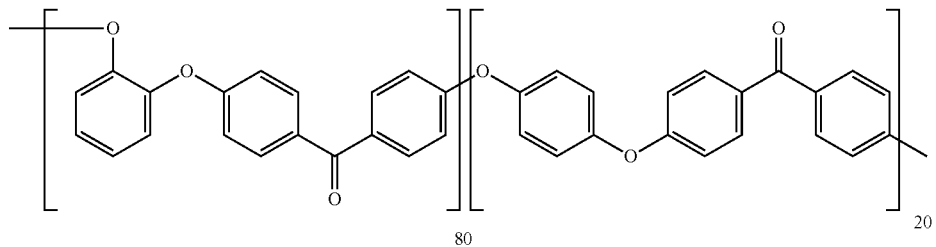

The properties of the polymer are disclosed in table 3 below.

Examples 7-12: Preparation of PEEK-PEoEK Copolymer 80/20, 75/25 and 70/30

The same procedure as example 6 was followed but with the following reagents amounts. The properties of the resulting polymer are in table 3.

TABLE 2

| | | examples 7-12 reagents | | | | | |
|---|---|---|---|---|---|---|---|
| Reagent | Units | Ex. 7 | Ex. 8 | Ex. 9 | Ex. 10 | Ex. 11 | Ex. 12 |
| PEEK/PEoEK | | 80/20 | 80/20 | 75/25 | 75/25 | 75/25 | 70/30 |
| Diphenyl sulfone | g | 343.63 | 343.63 | 343.63 | 343.63 | 343.63 | 343.63 |
| Hydroquinone | g | 61.852 | 61.891 | 57.987 | 57.987 | 58.022 | 54.121 |
| pyrocatechol | g | 15.426 | 15.426 | 19.282 | 19.282 | 19.282 | 23.139 |
| 4,4'-difluorobenzophenone | g | 153.809 | 154.571 | 154.573 | 154.573 | 154.724 | 153.351 |
| $Na_2CO_3$ | g | 76.938 | 76.936 | 76.938 | 76.938 | 76.936 | 76.938 |
| $K_2CO_3$ | g | 0.484 | 0.484 | 0.484 | 0.484 | 0.484 | 0.484 |

TABLE 2-continued examples 7-12 reagents

| Reagent | Units | Ex. 7 | Ex. 8 | Ex. 9 | Ex. 10 | Ex. 11 | Ex. 12 |
|---|---|---|---|---|---|---|---|
| Time at 320° C. | min | 13 | 15 | 16 | 7 | 14 | 73 |
| 4,4'-difluorobenzophenone in first termination | g | 18.329 | 10.692 | 18.329 | 18.329 | 10.692 | 18.329 |
| Lithium chloride in second termination | g | 2.388 | 2.968 | 2.388 | 2.388 | 2.968 | 2.388 |
| 4,4'-difluorobenzophenone in third termination | g | 6.110 | 6.110 | 6.110 | 6.110 | 6.110 | 6.110 |
| Polymer weight | g | 191 | 189 | 188 | 190 | 187 | 188 |

TABLE 3 presents the properties of the samples prepared according to examples 1-12

| Property | Units | CE0 | CE1 | CE2 | CE3 | CE4 | CE5 |
|---|---|---|---|---|---|---|---|
| PAEK unit | | None | PEKK | PEDEK | PEDEK | PEDEK | PEmEK |
| PEEK/PAEK ratio | mol/mol | 100/0 | | 75/25 | 75/25 | 80/20 | 80/20 |
| MV (410° C., 46 s$^{-1}$) | kN-s/m$^2$ | 1.1 | 0.58 | 0.28 | 0.43 | 0.16 | 0.31 |
| Tg | ° C. | 151 | 160 | 153 | 153 | 151 | 135 |
| Tm | ° C. | 340 | 301 | 304 | 305 | 312 | 311 |
| Tc | ° C. | 282 | 208 | 240 | 244 | 256 | 243 |
| Heat fusion | J/g | 50 | 8 | 38 | 36 | 41 | 53 |
| T$_1$ molding | ° C. | 421 | N/A | 343 | 343 | 365 | 377 |
| Ca | ppm | | | | | | |
| Na | ppm | | | | | | |
| P | ppm | | | | | | |
| Abs ratio 700 cm$^{-1}$/704 cm$^{-1}$ | | | | | | | |
| Abs ratio 623 cm$^{-1}$/557 cm$^{-1}$ | | | | | | | |
| Abs ratio 928 cm$^{-1}$/924 cm$^{-1}$ | | | | | | | |
| Abs ratio 816 cm$^{-1}$/835 cm$^{-1}$ | | | | | | | |
| Ultimate$^a$ Tensile strength by CM$^b$ | MPa psi | 95.813900 | N/A | 78.611400 @break | 90.313100 | 93.113500 | 63.29160 @break |
| Tensile modulus by CM$^b$ | GPa ksi | 3.87561 | N/A | 3.61523 | 3.23468 | 3.60522 | 4.44644 |
| Ultimate Tensile strength by IM$^c$ | MPa psi | | | | 9.013000 | | |
| Tensile modulus by IM$^c$ | GPa ksi | | | | 3.22467 | | |
| Dielectric constant @ 2.4 GHz | | 3.16 | 3.26 | 3.13 | | 3.15 | 3.15 |
| Dissipation factor @ 2.4 GHz | | 0.0026 | 0.0032 | 0.0025 | | 0.0025 | 0.0020 | presents the properties of the samples prepared according to examples 1-12

| Property | Units | E6 | E7 | E8 | E9 | E10 | E11 | E12 |
|---|---|---|---|---|---|---|---|---|
| PAEK unit | | PEoEK | PEoEK | PEoEK | PEoEK | PEoEK | PEoEK | PEoEK |
| PEEK/PAEK ratio | mol/mol | 80/20 | 80/20 | 80/20 | 75/25 | 75/25 | 75/25 | 70/30 |
| MV (410° C., 46 s$^{-1}$) | kN-s/m$^2$ | 0.30 | 1.95 | 0.08 | 0.32 | 0.25 | 0.03 | 1.41 |
| Tg | ° C. | 146 | 146 | 141 | 143 | 146 | 141 | 145 |
| Tm | ° C. | 306 | 299 | 306 | 293 | 294 | 295 | 283 |
| Tc | ° C. | 241 | 187/254 | 250 | 193 | 223 | 227 | 253 |
| Heat fusion | J/g | 40 | 12 | 47 | 5 | 31 | 36 | 6 |
| T$_1$ molding | ° C. | 343 | 368 | N/A | 343 | N/A | N/A | 343 |
| Ca | ppm | | 2.1 | | <0.9 | | | 1.1 |
| Na | ppm | | 99 | | 78 | | | 103 |
| P | ppm | | 69 | | 112 | | | 56 |
| Abs ratio 700 cm$^{-1}$/704 cm$^{-1}$ | | | 0.97 | | 0.97 | | | 0.98 |
| Abs ratio 623 cm$^{-1}$/557 cm$^{-1}$ | | | 1.28 | | 1.39 | | | 1.39 |
| Abs ratio 928 cm$^{-1}$/924 cm$^{-1}$ | | | 1.04 | | 1.07 | | | 1.06 |
| Abs ratio 816 cm$^{-1}$/835 cm$^{-1}$ | | | 0.71 | | 0.63 | | | 0.65 |

TABLE 3-continued

| | | | | | | | | |
|---|---|---|---|---|---|---|---|---|
| Ultimate[a] Tensile strength by CM[b] | MPa psi | 100.0 14500 | 92.4 13400 | N/A | 94.5 13700 | N/A | N/A | 94.5 13700 |
| Tensile modulus by CM[b] | GPa ksi | 3.70 536 | 3.48 504 | N/A | 3.87 562 | N/A | N/A | 3.43 498 |
| Ultimate Tensile strength by IM[c] | MPa psi | 101.4 14700 | | | | | 101.4 14700 | |
| Tensile modulus by IM[c] | GPa ksi | 3.68 533 | | | | | 3.59 520 | |
| Dielectric constant @ 2.4 GHz | | | | | | | | 3.17 |
| Dissipation factor @ 2.4 GHz | | | | | | | | 0.0029 |

[a]ultimate strength is the greater of strength at yield and at break,
[b]CM = compression molded,
[c]IM = injection molded The data presented in table 3 shows that PEEK-PEoEK copolymers are low Tm PAEKs with the following attributes which are particularly beneficial in polymer-metal junction, which make them preferable in those junctions over the already know low TM PAEKs:

- Improved dielectric properties over PEKK (lower constant and dissipation factor)
- Increased crystallinity over PEKK for the same Tm as shown by value of heat of fusion
- More consistent processing than PEKK due to the existence of a single crystal form (see Zhen et al, Macromol. Chem. Phys., 1996, V 197, P 185-213), as can be confirmed by the presence of single Tm in the first heat of the polymer
- Higher Tg than PEEK-PEmEK, hence higher continuous use temperature
- Improved mechanical properties than PEEK-PEmEK at low molecular weight (low viscosity): compare CE5 with example 6 Improved mechanical properties over PEEK-PEDEK (CE2-CE4 to compare with Ex. 6, 7, 9, 10, 12) as measured both on compression or injection molded specimens. The possibility to reach lower Tm than with PEEK-PEDEK (Tm<295° C.)

Examples 13 and 14: Preparation of Glass Fiber Reinforced Compositions

Two chopped glass fiber reinforced compositions according to the invention were prepared by melt compounding using a 26 mm diameter Coperion® co-rotating partially intermeshing twin screw extruder having an L/D ratio of 48:1. The extruder was equipped with 12 barrel sections, with barrel sections 2 through 12 being temperature controlled. The extruder was fitted with a 3-mm diameter single-hole die. For each filled composition, the resin (prepared according to examples 11 and 8) and glass fiber were fed to the extruder using two independent K-Tron® gravimetric feeder. The resin feeder fed into the feed hopper (barrel section 1) while the chopped glass fiber was fed at a rate of 30% of the total feed rate using the second gravimetric feeder into the molten resin at barrel section 7. This was done to minimize attrition of the glass fiber from the compounding process. Vacuum venting with a vacuum level >25 in Hg was applied at barrel section 10 during the compounding to strip off moisture and any possible residual volatiles from the compounds. The extrudate from each of the compositions was stranded and the strands were cooled in a water trough and then pelletized using a Maag Primo 60 E pelletizer into pellets approximately 2.7 mm in diameter and 3.0 mm in length. The compositions and the compounding conditions used to prepare them are shown in the table below.

TABLE 4 preparation of glass filled compositions

| Ingredients | | Ex. 13 | Ex 14 |
|---|---|---|---|
| PEEK-PEoEK constituting units ratio | mol/mol | 75/25 | 80/20 |
| Ex. 11 material | % wt. | 70.0 | — |
| Ex. 8 material | % wt. | — | 70.0 |
| Chopped Glass Fiber OCV-910A | % wt. | 30.0 | 30.0 |

| Extruder Zone Temperature and Screw Speed Set Points | Set Points | Actual Conditions | Actual Conditions |
|---|---|---|---|
| Zone 2 (° C.) | 310 | 272 | 265 |
| Zone 3 (° C.) | 310 | 306 | 310 |
| Zone 4 (° C.) | 310 | 308 | 308 |
| Zone 5 (° C.) | 310 | 305 | 305 |
| Zone 6 (° C.) | 310 | 307 | 307 |
| Zone 7 (° C.) | 310 | 308 | 308 |
| Zone 8 (° C.) | 310 | 310 | 310 |
| Zone 9 (° C.) | 320 | 310 | 310 |
| Zone 10 (° C.) | 320 | 319 | 319 |
| Zone 11 (° C.) | 320 | 320 | 320 |
| Zone 12 (° C.) | 320 | 319 | 319 |
| Die (° C.) | 320 | 317 | 317 |
| Screw Speed (rpm) | 200 | 200 | 200 |
| Other Run Conditions Recorded | | | |
| Melt Temperature (° C.) | | 343 | 340 |
| Total Feed Rate (lb/hr) | | 25.0 | 25.0 |
| Resin Feed Rate (lb/hr) | | 17.5 | 17.5 |
| Glass Fiber Feed Rate (lb/hr) | | 7.5 | 7.5 |
| Extruder Torque (% of Max Available) | | 66 | 46 |
| Die Pressure MPa (psi) | | 2.26 (328) | 1.63 (237) |
| Vacuum Level (in Hg) | | 26 | 26 |

Examples CE 15, Ex. 16-Ex. 17: Adhesion of Compositions to Aluminum

These Examples demonstrate the adhesion among polymer and metal achieved in the inventive polymer-metal junctions, via overmolding compositions onto aluminum A-6061 substrates. To demonstrate adhesion, lap shear samples were formed and the lap shear stress was measured at room temperature and according to the ASTM D1002 standard with a grip distance of 3.5 inches. Lap shear specimens were formed by overmolding the metal substrates with the described PAEK compositions. The metal substrates were formed from aluminum 6061 alloy and had a double butt lap joint with a surface area of about 0.25 square inches ("In").

The aluminum substrates were laser etched (Minilase™, from Tykma Technologies) to form a crosshatch pattern having a distance of about 100 μm between parallel lines. Following etching, the metal substrates were rinsed in acetone or isopropanol and dried in a vacuum oven at about 50 Torr to about 100 Torr and at about 50° C. or 100° C.

A PAEK composition was deposited on the metal substrates using injection molding (pellets pre-dried at 120° C./25" Hg vacuum for 4 hours). In particular, the metal substrates were preheated to a temperature of about 190° C. to about 200° C. in an oven and, subsequently, on a hotplate. The preheated substrates were then placed in an injection mold cavity heated to about 199° C. The PAEK composition was then injected, into the mold cavity, at a temperature between from about 382° C. to about 385° C. to form the lap shear samples. The pressure was 4.14 MPa (600 psi) and cycle time 45 s (10 s for injection). The lap shear sample was removed from the mold and allowed to continue to cool to room temperature.

The lap shear stress values, measured at 0.05 in/minute, listed in TABLE 5 are averaged over the number of lap shear samples in the corresponding Sample Set. The enthalpy of fusion, indicative of the degree of crystallinity of the compositions, derived from the melting endotherm on the $2^{nd}$ heat scan in DSC at 20° C./minute is also indicated in table 5. The values are expressed relative to the polymer content of the composition, i.e. excluding the filler content. This is obtained by dividing the values measured on the filled compositions by the polymer content (=0.70).

The results of the lap shear test measurements are reported with respect to lap shear stress at break as well and were further analyzed to determine the type of failure at break. In particular, following failure of the lap shear samples, the samples were analyzed to determine if the failure was "Adhesive", "Cohesive", "Partially Cohesive" or "Specimen Break." Adhesive failures were characterized by a lack of visually detectable polymer on the metal and lack of visually detectable metal on the polymer, on the fracture surface of the sample. Cohesive failures were characterized by a visually detectable amount of polymer on the metal or a visually detectable amount of metal on the polymer, on the fracture surface of the sample. Partially Cohesive failures were analogous to Cohesive failures but showed a reduced amount of polymer on the metal or metal on the polymer. "Specimen Break" was characterized by fracture in the bulk polymer and not at the metal/polymer interface.

TABLE 5 lap shear test results on aluminium substrates

| Example | PAEK composition | Heat of fusion (J/g polymer) of composition | Lap shear Stress MPa (psi) | Std. dev. MPa (psi) | No. Cohesive Failures | Failure Type |
|---|---|---|---|---|---|---|
| CE15 | KT-880GF30 | 68.4 | 3.96 (575) | 0.95 (137) | 0/5 | adhesive |
| Ex. 16 | Ex. 13 (75/25) | 40.1 | 6.20 (899) | 0.26 (37.2) | 0/5 | adhesive |
| Ex. 17 | Ex. 14 (80/20) | 43.0 | 6.07 (880) | 1.72 (249) | 0/5 | adhesive |

Referring to Table 5, the results demonstrate that for the lap shear samples tested, the compositions according to the invention significantly improve the adhesion to aluminum as compared to PEEK (CE15), while retaining a good level of crystallinity (>40.0 J/g heat of fusion).

Because of their low melting point, the compositions according to the invention allow easier and milder processing conditions, which are particularly advantageous in wire and cable extrusion methods and/or in all other methods used for making polymer-metal junctions.

Should the disclosure of any patents, patent applications, and publications which are incorporated herein by reference conflict with the description of the present application to the extent that it may render a term unclear, the present description shall take precedence.

The invention claimed is:

1. A polymer-metal junction, comprising:
   a metal substrate having a surface, and
   a polymer composition comprising a PEEK-PEoEK copolymer, the copolymer comprising at least 50 mol %, collectively, of repeat units ($R_{PEEK}$) and repeat units ($R_{PEoEK}$), relative to the total number of repeat units in the PEEK-PEoEK copolymer, wherein:
   (a) repeat units ($R_{PEEK}$) are repeat units of formula (A):

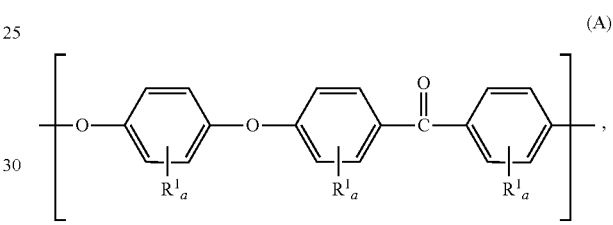

and
   (b) repeat units ($R_{PEoEK}$) are repeat units of formula (B):

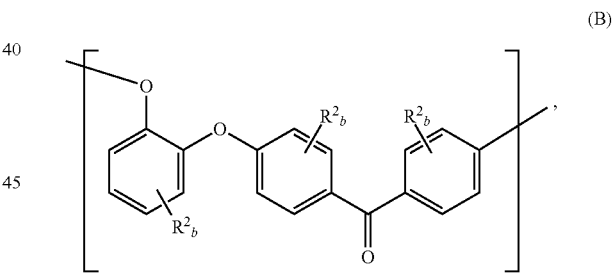

each $R^1$ and $R^2$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, each a and b is independently selected from the group consisting of integers ranging from 0 to 4, and the PEEK-PEoEK copolymer comprises the repeat units $R_{PEEK}$ and $R_{PEoEK}$ in a molar ratio $R_{PEEK}/R_{PEoEK}$ ranging from 95/5 to 5/95, wherein said polymer composition is in contact with at least part of the surface of said metal substrate.

2. The polymer-metal junction of claim 1, wherein the repeat units ($R_{PEEK}$) are repeat units of formula (A-1):

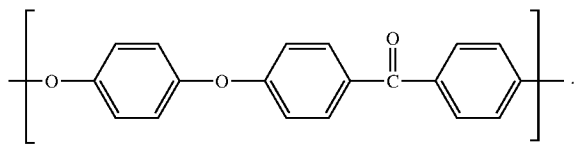

(A-1)

3. The polymer-metal junction of claim 1, wherein the repeat units ($R_{PEoEK}$) are repeat units of formula (B-1):

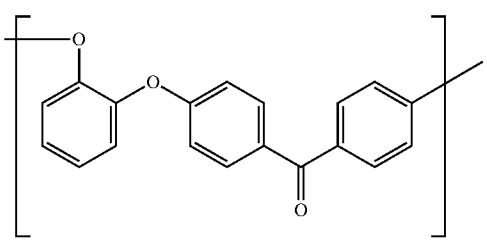

(B-1)

4. The polymer-metal junction of claim 1, wherein the PEEK-PEoEK copolymer consists essentially in repeat units ($R_{PEEK}$) and ($R_{PEoEK}$), wherein any additional repeat unit distinct from repeat units $R_{PEEK}$ and $R_{PEoEK}$, are either absent or may be present in amount of at most 2 mol. %, relative to the total number of moles of repeat units in the PEEK-PEoEK copolymer.

5. The polymer-metal junction of claim 1, wherein repeat units $R_{PEEK}$ and $R_{PEoEK}$ are present in the PEEK-PEoEK copolymer in a $R_{PEEK}/R_{PEoEK}$ molar ratio ranging from 95/5 to more than 50/50.

6. The polymer-metal junction of claim 1, wherein:
the PEEK-PEoEK copolymer has a melting temperature (Tm) of less than or equal to 340° C., wherein the melting temperature (Tm) is measured as the peak temperature of the melting endotherm on the second heat scan in a differential scanning calorimeter (DSC) according to ASTM D3418-03 and E794-06, and using heating and cooling rates of 20° C./min; and/or
the PEEK-PEoEK copolymer has as heat of fusion (ΔH) of at least 1 J/g, wherein the heat of fusion is determined as the area under the melting endotherm on the second heat scan in a differential scanning calorimeter (DSC) according to ASTM D3418-03 and E793-06, with heating and cooling rates of 20° C./min.

7. The polymer-metal junction of claim 1, wherein the PEEK-PEoEK copolymer possesses a microstructure such that its FT-IR spectrum, when recorded between 600 and 1,000 cm⁻¹ in ATR mode on polymer powder, is such that the following inequalities are satisfied:

(i)
$$\frac{A_{700\,cm^{-1}}}{A_{704\,cm^{-1}}} \leq 0.99,$$

wherein $A_{700\,cm^{-1}}$ is the absorbance at 700 cm$^{-1}$ and $A_{704\,cm^{-1}}$ is the absorbance at 704 cm$^{-1}$;

(ii)
$$\frac{A_{816\,cm^{-1}}}{A_{835\,cm^{-1}}} \geq 0.61,$$

wherein $A_{816\,cm^{-1}}$ is the of absorbance at 816 cm$^{-1}$ and $A_{835\,cm^{-1}}$ is the absorbance at 835 cm$^{-1}$;

(iii)
$$\frac{A_{623\,cm^{-1}}}{A_{557\,cm^{-1}}} \leq 1.60,$$

wherein $A_{623\,cm^{-1}}$ is the of absorbance at 623 cm$^{-1}$ and $A_{557\,cm^{-1}}$ is the absorbance at 557 cm$^{-1}$;

(iv)
$$\frac{A_{928\,cm^{-1}}}{A_{924\,cm^{-1}}} \leq 1.09,$$

wherein $A_{928\,cm^{-1}}$ is the of absorbance at 928 cm$^{-1}$ and $A_{924\,cm^{-1}}$ is the absorbance at 924 cm$^{-1}$.

8. The polymer-metal junction of claim 1, wherein:
the PEEK-PEoEK copolymer has a calcium content of less than 5 ppm, as measured by Inductively Coupled Plasma Optical Emission Spectrometry (ICP-OES) calibrated with standards of known calcium content; and/or
the PEEK-PEoEK copolymer has a sodium content of less than 1,000 ppm, as measured by Inductively Coupled Plasma Optical Emission Spectrometry (ICP-OES) calibrated with standards of known sodium content; and/or
the PEEK-PEoEK copolymer has a phosphorus content of at least 6 ppm, as measured by Inductively Coupled Plasma Optical Emission Spectrometry (ICP-OES) calibrated with standards of known phosphorus content.

9. The polymer-metal junction of claim 1, wherein the polymer composition comprises at least one of a reinforcing filler, at least one additive, or a combination of both.

10. The polymer-metal junction of claim 1, wherein the composition comprises at least 10 wt. % of PEEK-PEoEK copolymer, based on the total weight of the polymer composition.

11. The polymer-metal junction of claim 1, wherein the polymer composition comprises at least one reinforcing filler, a carbon fiber, or a combination thereof.

12. The polymer-metal junction of claim 1, wherein:
the metal substrate is made of any metallic composition selected from the group consisting of aluminum, copper, gold, iron, nickel, platinum, silver, steel, and blends or alloys thereof; and/or
said part of the surface of the metal substrate or the said overall surface of the metal substrate is a structured metal surface; and/or
the metal substrate is selected from the group consisting of a wire, a cable and a metal part of a mobile electronic device.

13. The polymer-metal junction of claim 1, wherein the polymer-metal junction comprises a lap shear stress of at least 4.93 MPa to a structured aluminum surface comprising a crosshatch pattern having a distance of about 100 μm between parallel lines, as measured according to ASTM D1002.

14. A method of making the polymer-metal junction claim 1, comprising a step of coating the said composition comprising the PEEK-PEoEK copolymer onto at least a part of the surface of the metal substrate.

15. A shaped article comprising the polymer-metal junction of claim 1, which is selected from the group consisting of:
- shaped articles consisting of the polymer metal junction of claim 1; and
- shaped articles consisting of more than one part, one or more of which consists of the polymer metal junction of claim 1.

* * * * *